United States Patent
Xie (10) Patent No.: US 12,426,574 B2
(45) Date of Patent: Sep. 30, 2025

(54) ANIMAL TOENAIL KNIFE CAPABLE OF EMITTING LIGHT AND BEING STORED

(71) Applicant: Shenzhen Lecheng Pet Products Co., Ltd., Shenzhen (CN)

(72) Inventor: Xiaodi Xie, Leizhou (CN)

(73) Assignee: Shenzhen Lecheng Pet Products Co., Ltd., Shenzhen (CN)

( * ) Notice: Subject to any disclaimer, the term of this patent is extended or adjusted under 35 U.S.C. 154(b) by 272 days.

(21) Appl. No.: 18/324,357

(22) Filed: May 26, 2023

(65) Prior Publication Data

US 2023/0292710 A1    Sep. 21, 2023

(51) Int. Cl.
*A01K 13/00* (2006.01)
*A45D 29/02* (2006.01)
*F21V 33/00* (2006.01)

(52) U.S. Cl.
CPC .............. *A01K 13/00* (2013.01); *A45D 29/02* (2013.01); *A45D 2029/026* (2013.01); *F21V 33/0004* (2013.01)

(58) Field of Classification Search
USPC .......................................................... 30/271
See application file for complete search history.

(56) References Cited

U.S. PATENT DOCUMENTS

| | | | | |
|---|---|---|---|---|
| 5,819,416 A * | 10/1998 | Robinson | ................ | B26B 13/20 30/271 |
| 7,263,775 B2 * | 9/2007 | Moulton, III | .......... | A01K 13/00 7/162 |
| 7,464,665 B1 * | 12/2008 | Rogers | ................... | A01K 13/00 119/600 |
| 10,173,332 B1 * | 1/2019 | Zhu | .......................... | B26B 13/22 |
| 10,506,796 B1 * | 12/2019 | Lee | .......................... | A01K 17/00 |
| 2006/0158871 A1 * | 7/2006 | Hopkins | ................ | A45D 29/02 362/119 |
| 2019/0320616 A1 * | 10/2019 | Jacobowitz | ............ | A01K 13/00 |
| 2023/0292710 A1 * | 9/2023 | Xie | ........................ | A01K 13/00 30/29 |

FOREIGN PATENT DOCUMENTS

| | | | | |
|---|---|---|---|---|
| CN | 210130251 U | | 3/2020 | |
| CN | 211671900 U | * | 10/2020 | |
| CN | 212325748 U | | 1/2021 | |
| CN | 218551555 U | | 3/2023 | |
| KR | 200322306 Y1 | * | 8/2003 | ............. A45D 29/02 |

OTHER PUBLICATIONS

English translation of CN-211671900-U, dated Oct. 16, 2020.*
English translation of KR-200322306-Y1, dated Aug. 9, 2003.*

* cited by examiner

*Primary Examiner* — Hwei-Siu C Payer (57) ABSTRACT

The present application provides an animal toenail knife capable of emitting light and being stored, including a storage lighting device, a switch arranged on the surface of one handle, and a battery disposed inside the same handle. The storage lighting device is arranged on the surface of one shearing blade in a rotating manner, and the bottom of the storage lighting device is provided with a storage groove. In addition, a light-emitting element is further arranged in the storage lighting device. Therefore, toenails can be safely trimmed without damaging blood vessels inside the toenails, and the trimmed toenails fall into a storage cavity.

8 Claims, 7 Drawing Sheets

ANIMAL TOENAIL KNIFE CAPABLE OF EMITTING LIGHT AND BEING STORED

TECHNICAL FIELD

The present invention relates to the field of animal toenail knives, in particular to an animal toenail knife capable of emitting light and being stored.

BACKGROUND

Generally, if toenails of pets grow above a certain level, there is a risk that the owner will be scratched by the pets. Therefore, toenails of pets should be trimmed periodically with scissors or toenail knives.

A pet toenail knife in the prior art includes: a pair of upper and lower pressing plates, which are combined with each other through rear ends to maintain an elastically open state of front ends, where cutting portions are formed at the front ends; a fixing pin, which is rotatably and vertically inserted into a hole formed by respectively perforating through holes in the front ends of the upper and lower pressing plates; and a pressing handle, which is combined, in an embedded manner, with a groove formed in the upper end of the fixing pin, so as to function as a lever.

Therefore, when toenails of a pet are to be trimmed, the toenails of the pet are inserted between the upper and lower pressing plates, and if the pressing handle is pressed, the length of the inserted toenails is cut by the respective cutting portions while the upper and lower pressing plates are close to each other.

However, there is a problem with the existing pet toenail knife: a user cuts toenails by judging with naked eye, and thus the positions of nerves or blood vessels in the toenails cannot be recognized, so that the blood vessels or nerves in the toenails can be cut by mistake, resulting in bleeding.

In addition, the existing pet toenail knife has the problem as follows: no dedicated storage space is provided, and the cut toenails fall directly to the ground and need to be cleaned additionally, which is very inconvenient.

SUMMARY

In order to solve the above problems, the present invention provides an animal toenail knife capable of emitting light and being stored, so as to solve the technical problems existing in the prior art.

To achieve the above object, the present invention adopts the technical solutions as follows: an animal toenail knife capable of emitting light and being stored includes: a pair of handles, which are connected by an elastic part; and a pair of shearing blades, where one end of each of the shearing blades is combined with the end of each of the handles, and a fixing pin is connected to a nut by passing through the two shearing blades, so that the two shearing blades are hinged to each other; the animal toenail knife capable of emitting light and being stored further includes a storage lighting device, a switch arranged on the surface of one handle, and a battery disposed inside the same handle, where the storage lighting device is rotatably arranged on the surface of one shearing blade, the bottom of the storage lighting device is provided with a storage groove, and the storage groove of the storage lighting device and the shearing blades enclose a storage cavity; in addition, a light-emitting element is further arranged in the storage lighting device, and the light-emitting element is electrically connected to the battery via the switch.

As a further optimized solution, the storage lighting device includes a storage rotating cover body and a fixed cover body, the storage rotating cover body includes a storage portion and an annular connection portion which are connected in sequence, the storage groove is formed in the bottom of the storage portion, and the annular connection portion surrounds the nut; and the fixed cover body is fixedly connected to the end of the fixing pin, so that the annular connection portion is located between the shearing blades and the fixed cover body.

As a further optimized solution, one side of the storage groove is further provided with a light-emitting groove, an outer side wall of the storage portion is formed with a light-emitting assembly hole which is communicated with the light-emitting groove, and the light-emitting element is assembled in the light-emitting groove by passing through the light-emitting assembly hole.

As a further optimized solution, the fixed cover body includes a fixed lid body and a fixed sleeve which is arranged at the bottom of the fixed lid body, where the fixed sleeve sleeves the nut and the end of the fixing pin, an internal thread groove is formed through the inside of the end of the fixing pin, a bolt is connected to the internal thread groove in a threaded manner by passing through the fixed lid body, and the annular connection portion is located between the shearing blades and the fixed lid body.

As a further optimized solution, the surface of the annular connection portion is provided with a plurality of locking grooves formed in an arc shape, the bottom of the fixed lid body is provided with a spring mounting sleeve, a spring and locking teeth are arranged in the spring mounting sleeve, the locking teeth are telescopically disposed in the spring mounting sleeve via the spring, and ends of the locking teeth extend to the outside of the spring mounting sleeve; and the annular connection portion rotates, so that the ends of the locking teeth are locked in different locking grooves.

As a further optimized solution, the longitudinal section of the locking grooves is an arc-shaped section, and the ends of the locking teeth are of an arc-shaped structure that matches the arc-shaped section.

As a further optimized solution, the surface of the annular connection portion is further provided with an arc-shaped baffle, where a wiring channel is formed between the arc-shaped baffle and an outer side wall of the fixed sleeve, the side of an inner side wall of the fixed lid body that is close to the light-emitting groove is formed with a relief waist hole, the side of the inner side wall of the fixed lid body that is away from the light-emitting groove is formed with a wiring hole, and the switch passes through the wiring hole via a wire and enters the wiring channel, and then passes through the relief waist hole to be electrically connected to the light-emitting element.

As a further optimized solution, a fixed groove is formed in the middle of the fixed lid body, and a fixed hole communicated with the fixed sleeve is formed in the bottom of the fixed groove, where the bolt is connected to the internal thread groove in a threaded manner by passing through the fixed hole, and a package cover covers the surface of the fixed groove.

As a further optimized solution, an inner side of the end of each of the two handles away from the shearing blade is provided with a limiting block.

As a further optimized solution, the side of any shearing blade is further provided with a limiting protrusion in a protruding manner, and one side of each of the handles is moveably provided with a limiting push plate, which moves to the limiting protrusion and abuts against the side of the limiting protrusion.

The present invention has the beneficial effects as follows: blood vessels in animal toenails can be accurately recognized by means of the light-emitting element used for emitting light in the direction of the shearing blades, so that the toenails in portions other than the blood vessels can be cut. In this case, the toenails can be safely trimmed without damaging the blood vessels inside the animal toenails. In addition, the toenails trimmed by the present application automatically fall into the storage cavity enclosed by the storage groove and the shearing blades, thereby preventing the trimmed toenails from being scattered to the ground, saving subsequent cleaning steps, and making it more convenient to use.

Description of reference numerals: handle 1, elastic part 11, limiting block 12, shearing blade 2, fixing pin 21, nut 22, limiting protrusion 23, storage lighting device 3, storage rotating cover body 31, storage portion 311, storage groove 3111, light-emitting assembly hole 3112, light-emitting groove 3113, annular connection portion 312, locking groove 3121, arc-shaped baffle 3122, fixed cover body 32, fixed lid body 321, spring mounting sleeve 3211, spring 3212, locking tooth 3213, relief waist hole 3214, wiring hole 3215, fixed groove 3216, fixed hole 3217, fixed sleeve 322, package cover 323, switch 4, battery 5, light-emitting element 6, and limiting push plate 7.

DETAILED DESCRIPTION OF THE EMBODIMENTS

Figure 1:
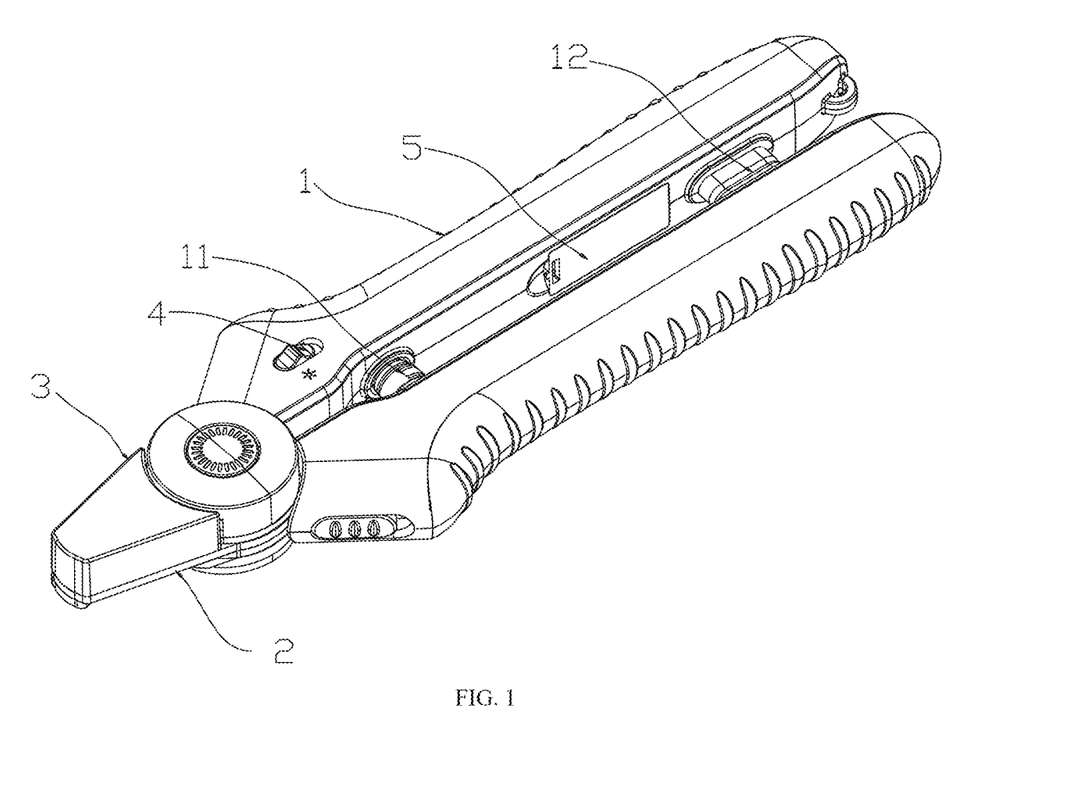
FIG. 1 is a schematic diagram of a three-dimensional structure of an animal toenail knife of the present application.
Figure 2:
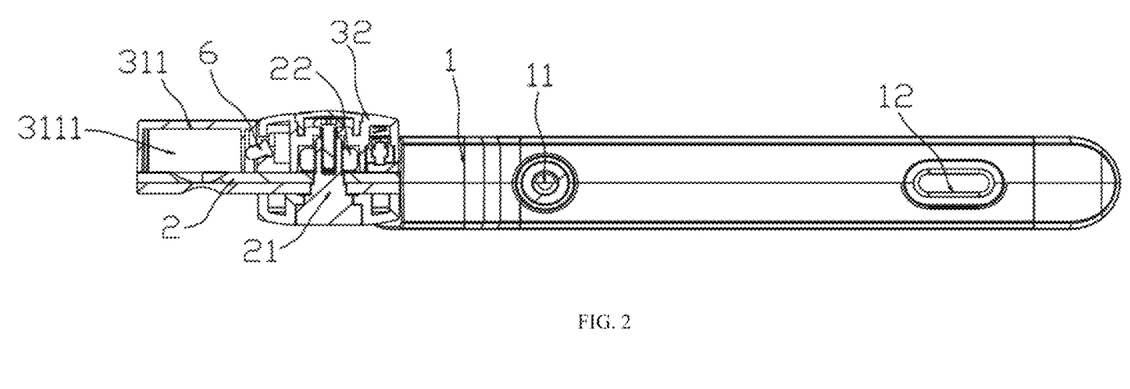
FIG. 2 is a schematic diagram of a cross-sectional structure of the animal toenail knife of the present application.
Figure 3:
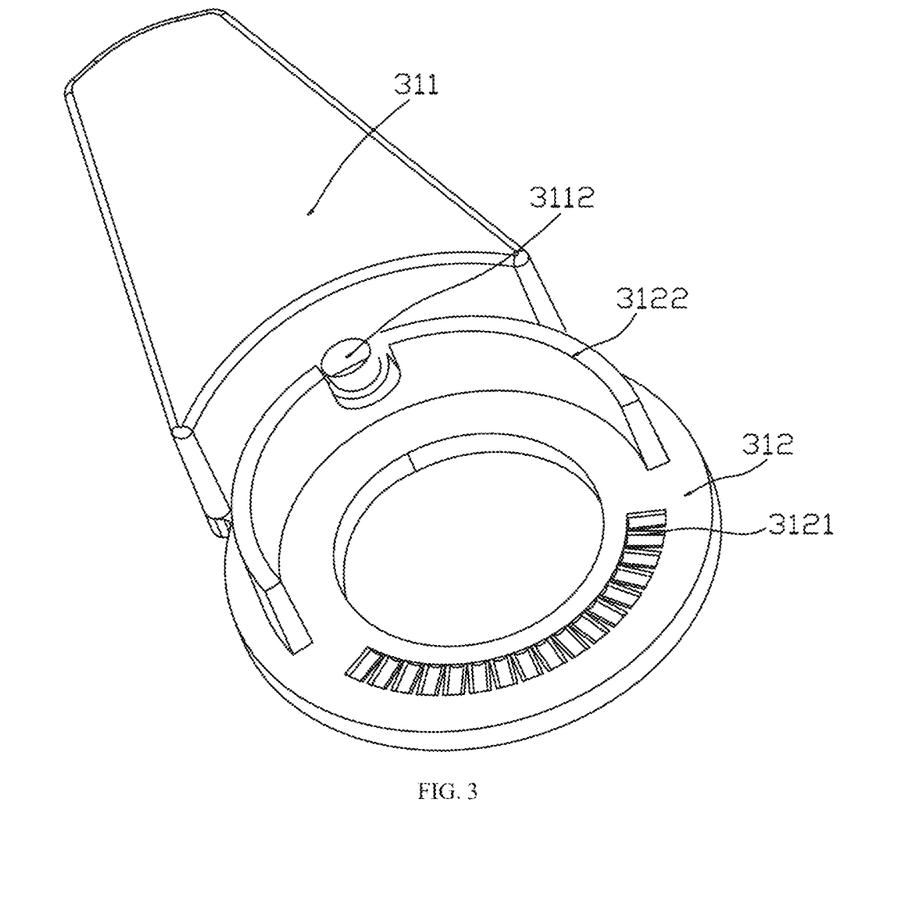
FIG. 3 is a schematic structural diagram of a storage rotating cover body.
Figure 4:
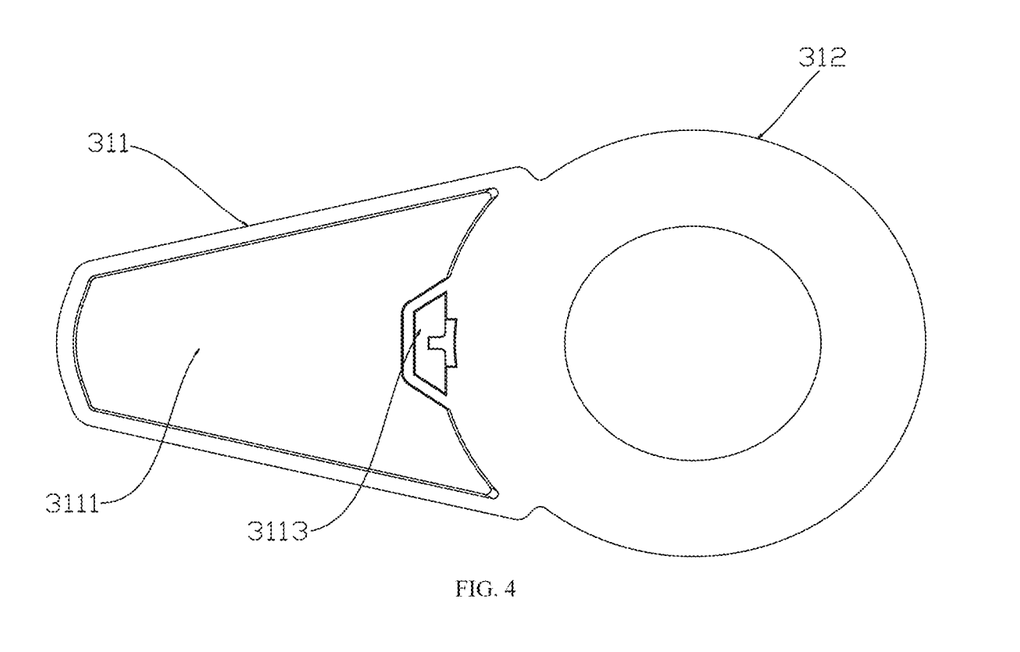
FIG. 4 is a schematic structural diagram of a bottom view of the storage rotating cover body.
Figure 5:
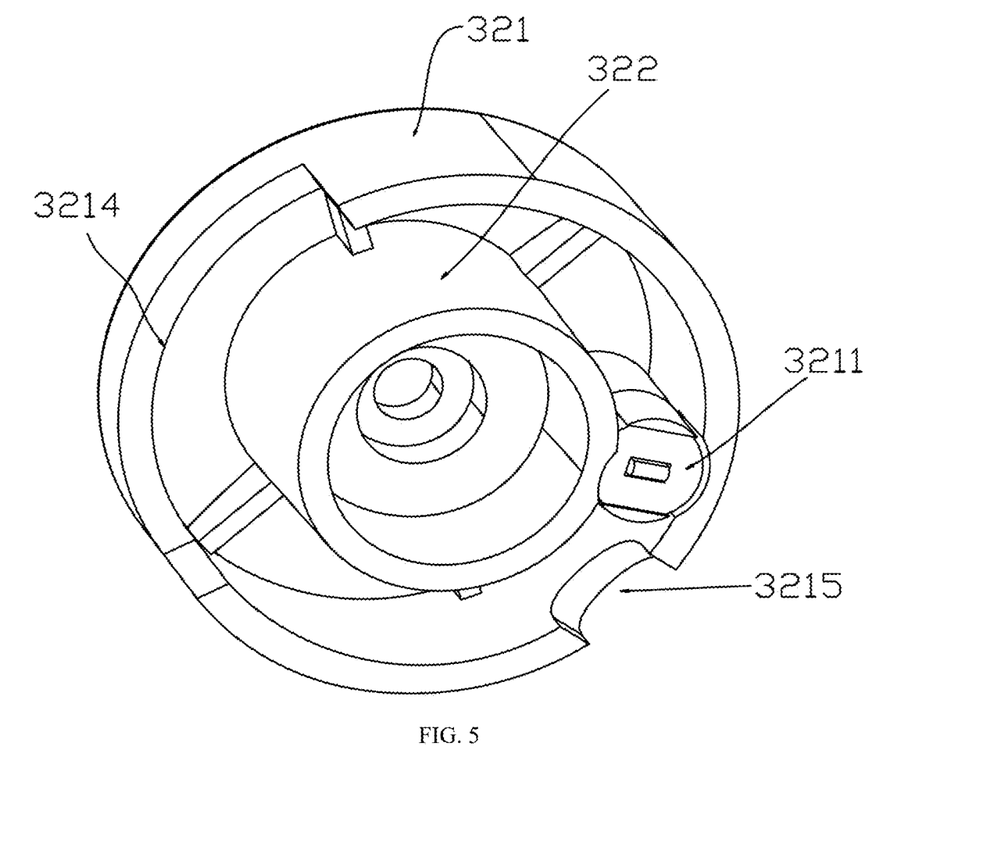
FIG. 5 is a schematic diagram of a three-dimensional structure of a fixed cover body.
Figure 6:
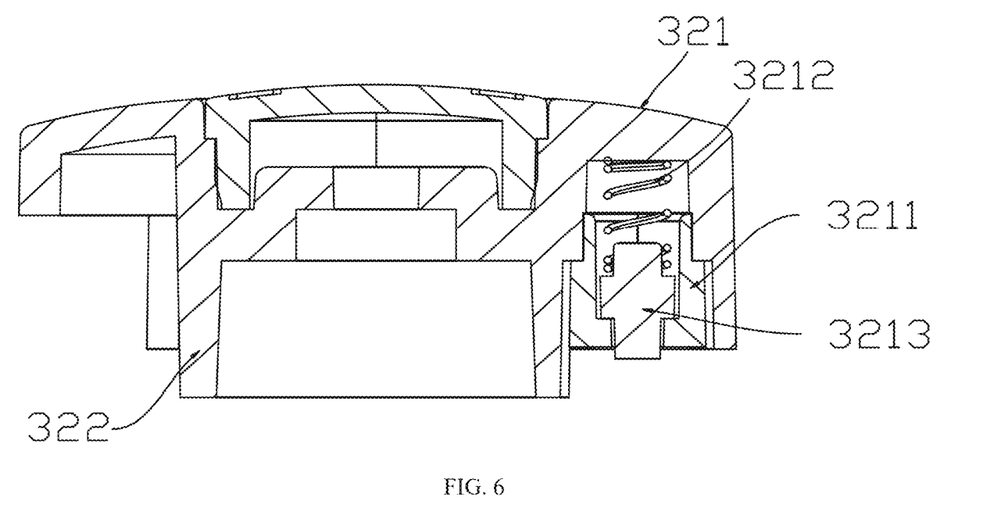
FIG. 6 is a schematic cross-sectional view after the fixed cover body, the spring and the locking teeth are assembled.
Figure 7:
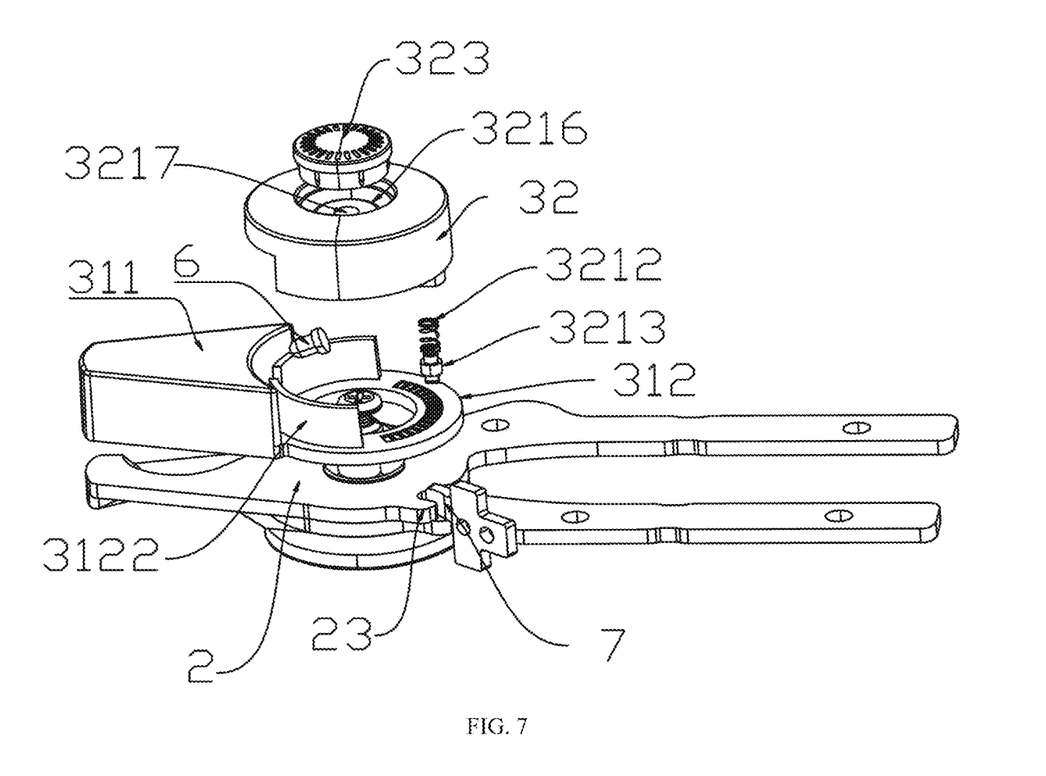
FIG. 7 is an exploded view of internal parts of the toenail knife.

Referring to FIGS. 1-7, the present invention relates to an animal toenail knife capable of emitting light and being stored, including: a pair of handles 1, which are connected by an elastic part 11; and a pair of shearing blades 2, where one end of each of the shearing blades 2 is combined with the end of each of the handles 1, and a fixing pin 21 is connected to a nut 22 by passing through the two shearing blades 2, so that the two shearing blades 2 are hinged to each other; the animal toenail knife capable of emitting light and being stored further includes a storage lighting device 3, a switch 4 arranged on the surface of one handle 1, and a battery 5 disposed inside the same handle 1, where the storage lighting device 3 is rotatably arranged on the surface of one shearing blade 2, the bottom of the storage lighting device 3 is provided with a storage groove 3111, and the storage groove 3111 of the storage lighting device 3 and the shearing blades 2 enclose a storage cavity; in addition, a light-emitting element 6 is further arranged in the storage lighting device 3, and the light-emitting element 6 is electrically connected to the battery 5 via the switch 4.

In this solution, blood vessels in animal toenails can be accurately recognized by means of the light-emitting element 6 used for emitting light in the direction of the shearing blades 2, so that the toenails in portions other than the blood vessels can be cut. In this case, the toenails can be safely trimmed without damaging the blood vessels inside the animal toenails. In addition, the toenails trimmed by the present application automatically fall into the storage cavity enclosed by the storage groove 3111 and the shearing blades 2, thereby preventing the trimmed toenails from being scattered to the ground, saving subsequent cleaning steps, and making it more convenient to use.

The two shearing blades 2 in this solution are connected by the elastic part 11 and can automatically restore to the initial state, which helps to reduce the burden on the user's hand and improves the efficiency of the operation.

At the same time, the switch 4, the battery 5 and etc. are further provided in this solution, which is convenient for users to operate anytime and anywhere.

As a further optimized solution, the storage lighting device 3 includes a storage rotating cover body 31 and a fixed cover body 32, the storage rotating cover body 31 includes a storage portion 311 and an annular connection portion 312 which are connected in sequence, the storage groove 3111 is formed at the bottom of the storage portion 311, and the annular connection portion 312 surrounds the nut 22; and the fixed cover body 32 is fixedly connected to the end of the fixing pin 21, so that the annular connection portion 312 is located between the shearing blades 2 and the fixed cover body 32.

The storage cavity can accommodate animal toenails cut by the shearing blades 2, and can prevent the toenails from splashing in all directions during the cutting of the toenails. In this case, the storage cavity allows the user to cut the toenails of a pet while looking at the shearing blades 2. Preferably, the storage rotating cover body 31 is made of a transparent material such as polyethylene terephthalate (PET), polypropylene (PP), polystyrene (PS), and silicone rubber.

In this solution, the storage rotating cover body 31 is sleeved on the nut 22 via the annular connection portion 312, so that the storage rotating cover body 31 can realize a rotating action, which facilitates the release of the toenails accommodated in the storage cavity to a specified position. Moreover, in order to prevent the storage rotating cover body 31 from falling off, the fixed cover body 32 is fixedly connected to the end of the fixing pin 21 in this solution, so that the annular connection portion 312 is located between the shearing blades 2 and the fixed cover body 32.

As a further optimized solution, the fixed cover body 32 includes a fixed lid body 321 and a fixed sleeve 322 which is arranged at the bottom of the fixed lid body 321, where the fixed sleeve 322 sleeves the nut 22 and the end of the fixing pin 21, an internal thread groove is formed through the inside of the end of the fixing pin 21, a bolt is connected to the internal thread groove in a threaded manner by passing through the fixed lid body 321, and the annular connection portion 312 is located between the shearing blades 2 and the fixed lid body 321.

In this solution, the bolt is connected to the internal thread groove in a threaded manner by passing through the fixed lid body 321, thereby realizing fixation between the entire fixed cover body 32 and the fixing pin 21, and at the same time, further ensuring that the annular connection portion 312 is located between the shearing blades 2 and the fixed lid body 321, that is, the annular connection portion 312 can be prevented from falling off from the fixing pin 21. Such design improves the stability of the entire device and prolongs the service life of the device.

As a further optimized solution, the surface of the annular connection portion 312 is provided with several locking grooves 3121 formed in an arc shape, the bottom of the fixed lid body 321 is provided with a spring mounting sleeve 3211, a spring 3212 and locking teeth 3213 are arranged in the spring mounting sleeve 3211, the locking teeth 3213 are telescopically disposed in the spring mounting sleeve 3211 via the spring 3212, and ends of the locking teeth 3213 extend to the outside of the spring mounting sleeve 3211; and the annular connection portion 312 rotates, so that the ends of the locking teeth 3213 are locked in different locking grooves 3121.

In this solution, in order to ensure the stability of the storage rotating cover body 31 during rotation, the locking teeth 3213 are arranged at the bottom of the fixed cover body 321, and at the same time, and the ends of the locking teeth 3213 are kept pressing the locking grooves 3121 under the action of the spring 3212, so that the storage rotating cover body 31 can maintain the rotating state when rotating to a certain angle, and will not be swayed. Moreover, in the present application, the plurality of continuously formed locking grooves 3121 are provided, so that the storage rotating cover body 31 can rotate at an angle of about 120°.

As a further optimized solution, in order to ensure the smoothness during the rotation of the storage rotating cover body 31, in this solution, the longitudinal section of the locking grooves 3121 is an arc-shaped section, and the ends of the locking teeth 3213 are of an arc-shaped structure that matches the arc-shaped section. The cooperation of the arc-shaped section and the arc-shaped structure can ensure that the impossible rotation as the ends of the locking teeth 3213 are stuck in the locking grooves 3121 is avoided. When the annular connection portion 312 rotates, the edges of the locking grooves 3121 with the arc-shaped section apply an oblique upward force, so that, with the rotation of the annular connection portion 312, the ends of the locking teeth 3213 are squeezed and move upwards at the same time. However, due to the force of the spring 3212, the ends of the locking teeth 3213 are always close to the locking grooves 3121 during the movement, so that the annular connection portion 312 continues to rotate, and the ends of the locking teeth 3213 enter the next locking groove 3121 under the force of the spring 3212, thereby achieving level-by-level positioning.

On the whole, the advantage of this design lies in that the stability and smoothness of the storage rotating cover body 31 during rotation can be ensured. Due to the matching design of the arc-shaped section and the arc-shaped structure, the movement trajectory of the ends of the locking teeth 3213 is smooth. Meanwhile, designing a plurality of continuously arranged locking grooves 3121 can further allow the storage rotating cover body 31 to support a larger rotation angle, and thus the flexibility and applicability of the design are improved.

As a further optimized solution, one side of the storage groove 3111 is further provided with a light-emitting groove 3113, an outer side wall of the storage portion 3111 is formed with a light-emitting fitting hole 3112 which is communicated with the light-emitting groove 3113, and the light-emitting element 6 is assembled in the light-emitting groove 3113 by passing through the light-emitting assembly hole 3112.

In this solution, by arranging the light-emitting groove 3113 in one side of the storage groove 3111, the light-emitting element 6 can be fixed in the storage portion 311 without falling off due to factors such as vibration during operation. Meanwhile, the light-emitting assembly hole 3112 is formed in the outer side wall of the storage portion 311, which can facilitate the mounting of the light-emitting element 6. The light-emitting groove 3113 faces forwards and can illuminate the two shearing blades 2, making both easier to be observed by the user, thereby improving operation convenience and accuracy. Moreover, with the cooperation of the light-emitting element 6, the tool can also be used in a darker environment. Overall, this solution not only improves tool utility and operation stability, but also enhances tool visibility and use experience.

As a further optimized solution, the surface of the annular connection portion 312 is further provided with an arc-shaped baffle 3122, where a wiring channel is formed between the arc-shaped baffle 3122 and an outer side wall of the fixed sleeve 322, the side of an inner side wall of the fixed lid body 321 that is close to the light-emitting groove 3113 is formed with a relief waist hole 3214, the side of the inner side wall of the fixed lid body 321 that is away from the light-emitting groove 3113 is formed with a wiring hole 3215, and the switch 4 passes through the wiring hole 3215 via a wire and enters the wiring channel, and then passes through the relief waist hole 3214 to be electrically connected to the light-emitting element 6.

In this solution, since the fixed cover body 321 is fixedly connected to the fixing pin 21, the fixed cover body 321 is fixed during the operation. Specifically, the side of the inner side wall of the fixed lid body 321 that is close to the light-emitting groove 3113 is formed with a relief waist hole 3214, which plays a role of preventing collision between the wire and the fixed lid body 321 when the rotating cover body rotates to cause a failure. On the other hand, the side of the inner side wall of the fixed lid body 321 that is away from the light-emitting groove 3113 is formed with a wiring hole 3215, and the switch 4 passes through the wiring hole 3215 via the wire and enters the wiring channel, and then passes through the relief waist hole 3214 to be electrically connected to the light-emitting element 6. The advantages of this design lie in effectively preventing the problem of the wire being stuck or squeezed by the rotating cover body, resulting in being disconnected, and ensuring the reliability and stability of an electrical connection. Forming the wiring channel between the arc-shaped baffle 3122 and the outer side wall of the fixed sleeve 322 also helps in the wiring and fixing of the wire.

As a further optimized solution, a fixed groove 3216 is formed in the middle of the fixed lid body 321, and a fixed hole 3217 communicated with the fixed sleeve 322 is formed in the bottom of the fixed groove 3216, where the bolt is connected to the internal thread groove in a threaded manner by passing through the fixed hole 3217, and a package cover 323 covers the surface of the fixed groove 3216. This solution has improvements in terms of aesthetics and practicality. The overall quality and reliability of the product can be improved by hiding the bolt and improving the dustproof effect using the package cover 323. Meanwhile, the design of the package cover 323 can also increase the aesthetics of the product, making the product more in line with market demand.

As a further optimized solution, an inner side of the end of each of the handles 1 away from the shearing blade 2 is provided with a limiting block 12. These limiting blocks 12 can limit the distance that the handles 1 move inwards during use, thereby preventing fingers from accidentally entering the range of the tail ends of the handles 1 and causing accidental injury. Meanwhile, these limiting blocks 12 can play a role of stabilizing the handles 1, making the toenail knife more stable and controllable in use.

As a further optimized solution, the side of any shearing blade 2 is further provided with a limiting protrusion 23 in a protruding manner, and one side of each of the handles 1 is moveably provided with a limiting push plate 7, which moves to the limiting protrusion 23 and abuts against the side of the limiting protrusion 23. When the user does not use the toenail knife, the limiting push plate 7 on the side of each of the handles 1 can move to the limiting protrusion 23 and abut against the same, thereby locking the shearing blades 2 in a fixed position and preventing accidental cutting of fingers or animal toenails. Such a design can provide users with a more stable operating experience and improve the safety of using the toenail knife.

The above embodiments are only description for preferred embodiments of the present invention, rather than limiting the scope of the present invention. Without departing from the design spirit of the present invention, various modifications and improvements made to the technical solutions of the present invention by those of ordinary skill in the art shall all fall within the protection scope determined by the claims of the present invention.

What is claimed is:

1. An animal toenail knife capable of emitting light and being stored, comprising:
   a pair of handles, which are connected by an elastic part; and
   a pair of shearing blades, wherein one end of each of the shearing blades is combined with one end of each of the handles, and a fixing pin is connected to a nut by passing through the two shearing blades, so that the two shearing blades are hinged to each other;
   the animal toenail knife capable of emitting light and being stored further comprises a storage lighting device, a switch arranged on a surface of one of the handles, and a battery disposed inside the same handle as the switch being arranged on, wherein the storage lighting device is rotatably arranged on a surface of one of the shearing blades, a bottom of the storage lighting device is provided with a storage groove, and the storage groove of the storage lighting device and the shearing blades enclose a storage cavity; in addition, a light-emitting element is further arranged in the storage lighting device, and the light-emitting element is electrically connected to the battery via the switch,
   wherein the storage lighting device comprises a storage rotating cover body and a fixed cover body, the storage rotating cover body comprises a storage portion and an annular connection portion which are connected in sequence, the storage groove is formed at a bottom of the storage portion, and the annular connection portion surrounds the nut; and the fixed cover body is fixedly connected to an end of the fixing pin, so that the annular connection portion is located between the shearing blades and the fixed cover body.

2. The animal toenail knife capable of emitting light and being stored according to claim 1, wherein one side of the storage groove is further provided with a light-emitting groove, an outer side wall of the storage portion is formed with a light-emitting assembly hole which is communicated with the light-emitting groove, and the light-emitting element is assembled in the light-emitting groove by passing through the light-emitting assembly hole.

3. The animal toenail knife capable of emitting light and being stored according to claim 2, wherein the fixed cover body comprises a fixed lid body and a fixed sleeve which is arranged at a bottom of the fixed lid body, where the fixed sleeve sleeves the nut and the end of the fixing pin, an internal thread groove is arranged through an inside of the end of the fixing pin, a bolt is connected to the internal thread groove in a threaded manner by passing through the fixed lid body, and the annular connection portion is located between the shearing blades and the fixed lid body.

4. The animal toenail knife capable of emitting light and being stored according to claim 3, wherein a surface of the annular connection portion is provided with a plurality of locking grooves formed in an arc shape, the bottom of the fixed lid body is provided with a spring mounting sleeve, a spring and a locking tooth are arranged in the spring mounting sleeve, the locking tooth is telescopically disposed in the spring mounting sleeve via the spring, and an end of the locking tooth extends to an outside of the spring mounting sleeve; and the annular connection portion rotates, so that the end of the locking tooth is locked in different one of the plurality of locking grooves.

5. The animal toenail knife capable of emitting light and being stored according to claim 4, wherein a longitudinal section of the locking grooves is an arc-shaped section, and the end of the locking tooth is of an arc-shaped structure that matches the arc-shaped section.

6. The animal toenail knife capable of emitting light and being stored according to claim 3, wherein a fixed groove is formed in a middle of the fixed lid body, and a fixed hole communicated with the fixed sleeve is defined at a bottom of the fixed groove, where the bolt is connected to the internal thread groove in a threaded manner by passing through the fixed hole, and a package cover covers a surface of the fixed groove.

7. The animal toenail knife capable of emitting light and being stored according to claim 1, wherein an inner side of another end of each of the handles away from the shearing blade is provided with a limiting block.

8. The animal toenail knife capable of emitting light and being stored according to claim 1, wherein a side of any one of the shearing blades is also provided with a limiting protrusion in a protruding manner, and one side of each of the handles is moveably provided with a limiting push plate, which moves to the limiting protrusion and abuts against a side of the limiting protrusion.

* * * * *